(12) United States Patent
Kozawa et al.

(10) Patent No.: US 12,517,976 B2
(45) Date of Patent: *Jan. 6, 2026

(54) METHOD FOR CONTROLLING MASS SPECTROMETER USING ANALYSIS DATA DETERMINED BY TWO VARIABLES

(71) Applicants: SHIMADZU CORPORATION, Kyoto (JP); KYOTO UNIVERSITY, Kyoto (JP)

(72) Inventors: Hiroaki Kozawa, Kyoto (JP); Yuichiro Fujita, Kyoto (JP); Yasushi Ishihama, Kyoto (JP); Kazuyoshi Yoshii, Kyoto (JP)

(73) Assignees: SHIMADZU CORPORATION, Kyoto (JP); KYOTO UNIVERSITY, Kyoto (JP)

( * ) Notice: Subject to any disclaimer, the term of this patent is extended or adjusted under 35 U.S.C. 154(b) by 985 days.

This patent is subject to a terminal disclaimer.

(21) Appl. No.: 17/518,257

(22) Filed: Nov. 3, 2021

(65) Prior Publication Data

US 2022/0237261 A1 Jul. 28, 2022

(30) Foreign Application Priority Data

Jan. 22, 2021 (JP) ................ 2021-009134

(51) Int. Cl.
*G06F 17/16* (2006.01)
*G01J 3/28* (2006.01)
*G06F 17/18* (2006.01)

(52) U.S. Cl.
CPC ............... *G06F 17/16* (2013.01); *G01J 3/28* (2013.01); *G06F 17/18* (2013.01)

(58) Field of Classification Search
CPC ........ G01J 3/28; G01J 3/30; G01J 3/40; G01J 3/457; G01J 3/46; G01J 2003/2859; G01J 2003/2863; G06F 17/16; G06F 17/18
See application file for complete search history.

(56) References Cited

U.S. PATENT DOCUMENTS

| 5,644,503 A * | 7/1997 | Ito ..................... G01N 30/8624 702/22 |
| 2009/0076737 A1* | 3/2009 | Wang ................ G01N 33/6848 702/23 |

(Continued)

FOREIGN PATENT DOCUMENTS

JP 2010-19655 A 1/2010

OTHER PUBLICATIONS

Kazuka Yoshii, et al., "NMF vs PLCA: For the multiple sound generation process and Infinite factor model and infinite mixed model", IPSJ SIG Technical Report, Aug. 1, 2016, pp. 1-10, vol. 2016-MUS-112, No. 21.

(Continued)

*Primary Examiner* — Emily E Larocque
(74) *Attorney, Agent, or Firm* — Sughrue Mion, PLLC

(57) ABSTRACT

Provided is a method for determining a first N×K matrix S and second K×M matrix P, using factor number K, so that their product SP approximates to an N×M data matrix X obtained by analyzing a sample containing an unknown number of components. Multiple candidates of regularization parameter λr and one sparsity-inducing regularization function R(S,P) are prepared. For each regularization-parameter candidate λr, a candidate Sr of matrix S and candidate Pr of matrix P which minimize a loss function L(S,P)=D(X|SP)+λrR(S,P) are determined, where D(X|SP) is a distance function expressing the degree of difference between X and SP. For each combination of matrix element $X_{nm}$ in X and corresponding matrix element $(SrPr)_{nm}$ in SrPr, (Continued)

a transformed value $y_{nm}=F_{nm}(X_{nm}(SrPr)_{nm})$ is determined using function $F_{nm}$ which performs variable transform from probability distribution $P_{nm}$ corresponding to $D(X_{nm}|(SP)_{nm})$ into common probability distribution Pcommon, and goodness of fit between $y_{nm}$ and Pcommon is calculated. Among the candidates of λr, a candidate is found which yields the highest value of the goodness of fit, or one which yields the goodness of fit higher than a predetermined threshold and also has the largest value of λr. The matrix candidates Sr and Pr determined for the found λr are selected as the first and second matrices S and P.

6 Claims, 9 Drawing Sheets

(56) References Cited

U.S. PATENT DOCUMENTS

| | | | | |
|---|---|---|---|---|
| 2009/0121125 | A1* | 5/2009 | Meija | G01N 30/8675 250/282 |
| 2020/0284739 | A1 | 9/2020 | Murano | |

OTHER PUBLICATIONS

José M. Bioucas-Dias, et al., "Hyperspectral Unmixing Overview: Geometrical Statistical, and Sparse Regression-Based Approaches", IEEE Journal of Selected Topics in Applied Earth Observations and Remote Sensing, Apr. 2012, pp. 354-379, vol. 5, No. 2.

Low-rank approximation—Low-rank_approximation-Wikipedia.
Andersen Man Shun Ang, et al., "Algorithms and Comparisons of Nonnegative Matrix Factorizations with vol. Regularization for Hyperspectral Unmixing", IEEE Journal of Selected Topics in Applied Earth Observations and Remote Sensing, 2019, pp. 1-11.
Hirotogu Akaike, "Information Theory and an Extension of the Maximum Likelihood Principle", Proceedings of the 2nd International Symposium on Information Theory, 1973, pp. 199 to 213.
Gideon Schwarz, "Estimating The Dimension of a Model", Annuals of Statistics, 1978, pp. 461-464, vol. 6, No. 2.
Probability Integral Transform Probability_integral_transfor-Wikipedia.
Chinese Office Action issued Jul. 19, 2023 for Application No. 202111214030.9.
Communication issued Jul. 31, 2023 in Chinese Application No. 202111189082.5.
Tsugawa et al., "New technology for comprehensively capturing small molecule metabolites in the body MS-DIALNext generation by prograrnMS/MSanalysis", Chemistry and Biology, vol. 54, No. 3, 2016 pp. 151-153 (6 pages total).
Hauck et al., "Quantitative Proteomics", PROT Core Facility Proteomics, Aug. 27, 2020, pp. 1-4.
Lee et al., "Algorithms for Non-negative Matrix Factorization", Advances in Neural Information Processing Systems, vol. 13, No. 1, 2001.
Rapin et al., "Application of Non-negative Matrix Factorization to LC/MS data", Signal Processing, vol. 123, pp. 1-8.
Communication issued Jan. 30, 2025 in Japanese Application No. 2021-009135.

\* cited by examiner

ACTUAL CHROMATOGRAMS (LEFT) AND
ACTUAL CORRESPONDING MASS SPECTRA (RIGHT)
(ACTUAL K=5)

SUPERPOSITION OF LARGE NUMBER OF ACTUAL MASS CHROMATOGRAMS
(WHICH CORRESPONDS TO DATA MATRIX)

<EXAMPLE IN WHICH $\lambda r$ IS TOO SMALL ($\lambda r=1$, K=7, KS STATISTIC=0.0924)>
CHROMATOGRAMS (LEFT) AND MASS SPECTRA (RIGHT)
OBTAINED BY MATRIX FACTORIZATION <EXAMPLE IN WHICH $\lambda r$ IS TOO LARGE ($\lambda r=512$, K=2, KS STATISTIC=0.2652)>
CHROMATOGRAMS (LEFT) AND MASS SPECTRA (RIGHT)
OBTAINED BY MATRIX FACTORIZATION <λr IS OPTIMUM (λr=256, K=5 (WHICH AGREES WITH ACTUAL DATA), KS STATISTIC=0.0164 (SMALLEST, HENCE HIGHEST GOODNESS OF FIT)>

CHROMATOGRAMS (LEFT) AND MASS SPECTRA (RIGHT) OBTAINED BY MATRIX FACTORIZATION

Fig. 10

$$X = \begin{pmatrix} X_{11} & X_{12} & X_{13} & * & * & * & * & * & X_{1M} \\ X_{21} & X_{22} & X_{23} & * & * & * & * & * & X_{2M} \\ X_{31} & X_{32} & X_{33} & * & * & * & * & * & X_{3M} \\ * & * & * & & * & & & & * \\ * & * & * & & & * & & & * \\ * & * & * & & & & * & & * \\ * & * & * & & & & & * & * \\ X_{N1} & X_{N2} & X_{N3} & * & * & * & * & * & X_{NM} \end{pmatrix}$$ N ROWS ↓

M COLUMNS →

Fig. 11

$$S = \begin{pmatrix} S_{11} & S_{12} & S_{13} & * & * & * & S_{1K} \\ S_{21} & S_{22} & S_{23} & * & * & * & S_{2K} \\ S_{31} & S_{32} & S_{33} & * & * & * & S_{3K} \\ * & * & * & * & & & * \\ * & * & * & & * & & * \\ * & * & * & & & * & * \\ S_{N1} & S_{N2} & S_{N3} & * & * & * & S_{NK} \end{pmatrix}$$ N ROWS

K COLUMNS →

$$P = \begin{pmatrix} p_{11} & p_{12} & p_{13} & * & * & * & * & p_{1M} \\ p_{21} & p_{22} & p_{23} & * & * & * & * & p_{2M} \\ p_{31} & p_{32} & p_{33} & * & * & * & * & p_{3M} \\ * & * & * & & * & & & * \\ * & * & * & & & * & & * \\ * & * & * & & & & * & * \\ p_{K1} & p_{K2} & p_{K3} & * & * & * & * & p_{KM} \end{pmatrix}$$ K ROWS

M COLUMNS →

METHOD FOR CONTROLLING MASS SPECTROMETER USING ANALYSIS DATA DETERMINED BY TWO VARIABLES

TECHNICAL FIELD

The present invention relates to a method for analyzing data of a component that is the target of a measurement determined by two variables including a first variable and a second variable which is another variable. For example, in the case of the data of a detection intensity acquired at each m/z (mass-to-charge ratio) and at each retention time by a chromatograph mass spectrometer, the m/z (mass-to-charge ratio) corresponds to the first variable, and the retention time corresponds to the second variable. In the case of the data of an m/z intensity acquired at each position by an imaging mass spectrometer, the m/z corresponds to the first variable, and the position corresponds to the second variable. In the case of the data of the absorption spectrum acquired at each position by an imaging FT-IR (Fourier transform infrared spectrophotometer), the absorption wavelength corresponds to the first variable, and the position corresponds to the second variable.

BACKGROUND ART

A set of data determined by two variables in the previously described manner can be represented by a data matrix with N rows and M columns in which the N rows of data differ from each other in the value of the first variable, while the M columns of data differ from each other in the value of the second variable, where N and M are natural numbers. For example, in a chromatograph mass spectrometer, such as a liquid chromatograph mass spectrometer (LC/MS) or gas chromatograph mass spectrometer (GC/MS), a mass spectrum formed by N pieces of data representing detection sensitivities at N m/z values is acquired at one retention time, and those N pieces of data form one column of the data matrix. There are M different retention times, and one mass spectrum is acquired at each retention time, so that M columns each of which includes N pieces of data are obtained. Consequently, a data matrix with N rows and M columns is obtained.

A sample to be subjected to a measurement by a chromatograph mass spectrometer contains one or more components. A "component" contained in a sample in the present context means a significant component that forms a peak whose height (or magnitude) on a chromatogram or mass spectrum is equal to or greater than a predetermined level. If K components (where K is a natural number) are contained in the sample, a mass spectrum obtained at each retention time or mass chromatogram obtained at each m/z value will be a superposition of mass spectra or mass chromatograms which respectively result from the K components. If the mass spectrum or mass chromatogram in the superposed form can be separated into K mass spectra or mass chromatograms corresponding to the individual components, it will be possible to obtain information on each individual component. To this end, a technique called "matrix factorization" can be used (for example, see Patent Literature 1).

In the matrix factorization, a spectrum matrix S with N rows and K columns and a profile matrix P with K rows and M columns are determined so that the aforementioned data matrix X with N rows and M columns can be expressed by SP, i.e., the product of the spectrum matrix S and the profile matrix P. As noted earlier, K corresponds to the number of components contained in the sample. This number is called the "factor number" in the technique of matrix factorization. Each column of the spectrum matrix S corresponds to one of the mass spectra of the K components, while each row of the profile matrix P corresponds to one of the chromatograms of the K components.

In most cases, it is impossible to analytically determine the spectrum matrix S and profile matrix P. To address this problem, a computer-based method is used as follows: A plurality of candidates of the spectrum matrix S and profile matrix P are prepared. For each combination of a candidate of the spectrum matrix S and that of the profile matrix P, a predetermined function $D(x|y)$ which shows an error between a matrix element in the product SP and the corresponding matrix element in the data matrix X in question is defined for each matrix element (this function is also called the "distance function" or "divergence"). The errors respectively obtained for the matrix elements are totaled. The spectrum matrix S and profile matrix P are determined so that the total error is minimized Examples of the distance function $D(x|y)$ include a Euclidean distance expressed by $(x-y)^2$, generalized KL (Kullback-Leibler) divergence expressed by $x \log(x/y)-(x-y)$, IS (Itakura-Saito) divergence expressed by $(x/y)-\log(x/y)-1$, and $\beta$ divergence, which is a generalization of the previously mentioned divergences and expressed as follows:

$$\frac{x^\beta}{\beta(\beta-1)} + \frac{y^\beta}{\beta} - \frac{xy^{\beta-1}}{\beta-1}$$

The total of the values of the function respectively obtained for the matrix elements, $D(X|SP) = \Sigma_{n,m} D(\lambda_{nm}|(SP)_{nm})$, represents the degree of difference between the data matrix X and the product SP. It should be noted that $(SP)_{nm}$ represents a matrix element in the matrix given by the product SP.

On the other hand, for an estimation problem of a parameter of a probability distribution, a maximum likelihood method is often used to obtain an estimated value of the parameter. Specifically, in a probability distribution having parameter $\theta$ (this may be a vector having multiple dimensions), a value of $\theta$ is determined which gives the largest value of a likelihood function $p(x|\theta)$ which expresses the likelihood of parameter $\theta$ for data x. It should be noted that an estimated value of parameter $\theta$ obtained by the maximization of the likelihood is equal to that of parameter $\theta$ obtained by the minimization of a negative log likelihood function, $-\log p(x|\theta)$. Since the minimization of the negative logarithmic likelihood is easier to calculate, this technique is more frequently used.

The matrix factorization can also be considered as a problem of the maximum likelihood estimation. In that case, the problem of determining the matrices S and P so as to minimize the distance function $D(X|SP)$ is identical to the problem of deducing, for each element of the matrix, a probability distribution and likelihood function $p(X_{nm}|(SP)_{nm})$ which correspond to the distance function. Specifically, consider four examples of the probability distribution: (i) Gaussian distribution, (ii) Poisson distribution, (iii) exponential distribution and (iv) Tweedie distribution. The negative log likelihood functions of these distributions respectively correspond to (i) Euclidean distance, (ii) generalized KL divergence, (iii) IS divergence and (iv) $\beta$ divergence (for example, see Non Patent Literature 1). Other than the four aforementioned examples of the correspondence relationship between the probability distribution and the distance function, it is generally possible to perform a similar estimation for any probability distribution by using its negative log likelihood function as the distance function.

In the area of the sparce modelling, a technique for obtaining a sparce set of estimated values of the parameter (e.g., a matrix in which a considerable number of matrix elements have a value of zero) is used. An example of such a technique is LASSO (least absolute shrinkage and selection operator), in which a loss function is defined by adding, to the distance function, an L1-norm or similar regularization term for inducing sparsity of the solution, and this loss function is minimized to obtain a solution in which unnecessary parameters have an estimated value of zero.

CITATION LIST

Patent Literature

Patent Literature 1: US 2009/0121125 A

Non Patent Literature

Non Patent Literature 1: Kazuyoshi Yoshii and three other authors, "NMF vs PLCA: Tajuuon Seisei Katei No Tame No Mugen Inshi Modem To Mugen Kongou Modem (NMF vs PLCA: Infinite Factor Model and Infinite Mixture Model for Multiple Sound Generation Process)", *IPSJ SIG Technical Report MUS (Musical Informatics)*, Vol. 2016-MUS-112, No. 21, pp. 1-10, Aug. 1, 2016

SUMMARY OF INVENTION

Technical Problem

In order to perform a matrix factorization on a data matrix X, it is necessary determine the factor number K. If the number of components contained in the sample is previously known, that number can be used as the factor number K. However, in many cases, that number is unknown. When the number of components contained in the sample is unknown, it is difficult to appropriately determine the factor number K, so that it is also difficult to appropriately determine the spectrum matrix S and profile matrix P based on the data matrix X. Similarly, as in the case of the sparse modeling, when a regularization term for inducing sparsity of the solution is added to the loss function, it is difficult to appropriately determine the value of the regularization parameter.

The problem to be solved by the present invention is to provide a data analysis method by which a spectrum matrix S and profile matrix P whose factor number K is appropriate and close to the number of components contained in a sample can be determined based on a data matrix X obtained by a measurement on the sample, even when the number of components is unknown.

Solution to Problem

A method for analyzing data which depend on two variables according to the present invention developed for solving the previously described problem is a method for determining a first matrix S with N rows and K columns and a second matrix P with K rows and M columns based on a data matrix X in which a set of data obtained from an analyzing device are arranged in N rows and M columns, where the N rows of data differ from each other in the value of a first variable, the M columns of data differ from each other in the value of a second variable, and the first matrix S and the second matrix P are determined so that the product SP approximates to the data matrix X, the method including:

a regularization parameter-regularization function preparation process for preparing a plurality of regularization-parameter candidates $\lambda r$ (where r is a natural number from 1 to $r_{max}$) and one regularization function R(S, P) which induces sparsity of the solution;

a matrix candidate determination process for solving an optimization problem for each of the plurality of regularization-parameter candidates $\lambda r$ so as to determine a matrix Srt as a candidate Sr of the first matrix S and a matrix Prt as a candidate Pr of the second matrix P, where the matrices Srt and Prt are determined so as to minimize the value of a loss function L(S, P)=D(X|SP)+$\lambda$rR(S, P), where D(X|SP) is a distance function expressing the degree of difference between the data matrix X and the product SP, while $\lambda$rR(S, P) is the product of the regularization-parameter candidate $\lambda r$ and the regularization function R(S, P);

a probability distribution transform process for determining, for each of the plurality of regularization-parameter candidates $\lambda r$, a transformed value $y_{nm}=F_{nm}(X_{nm}|(SrPr)_{nm})$ by a variable transform into a common probability distribution Pcommon for each combination of a matrix element $X_{nm}$ of the data matrix X and a corresponding matrix element $(SrPr)_{nm}$ of the product SrPr of the first-matrix candidate Sr and the second-matrix candidate Pr, using $F_{nm}$ which is a function for the variable transform from a probability distribution $P_{nm}$ corresponding to the distance function $D(X_{nm}|(SP)_{nm})$ into the common probability distribution Pcommon;

a goodness-of-fit calculation process for determining, for each of the plurality of regularization-parameter candidates $\lambda r$, a goodness of fit between the transformed value $y_{nm}$ and a cumulative distribution function of the probability distribution Pcommon; and a matrix determination process for selecting, as the first matrix S and the second matrix P, the first-matrix candidate Sr and the second-matrix candidate Pr determined for a regularization-parameter candidate $\lambda r$ which yields the highest value of the goodness of fit among the plurality of regularization-parameter candidates $\lambda r$, or a regularization-parameter candidate $\lambda r$ which yields the goodness of fit higher than a predetermined threshold and also has the largest value of $\lambda r$.

In the present description, for convenience, the first matrix is denoted by the same sign as the spectrum matrix, "S", while the second matrix is denoted by the same sign as the profile matrix, "P". In practice, the first and second matrices may be spectrum and profile matrices, respectively, as suggested by their respective signs, or the first and second matrices may be profile and spectrum matrices, respectively, as opposed to their respective signs. In the latter case, unlike the previously described definition, the spectrum matrix should be defined as a matrix with K rows and M columns, while the profile matrix should be defined as a matrix with N rows and K columns.

According to the present method, even when the number of components contained in the sample is unknown, a first-matrix candidate Sr in which all elements in one or more columns corresponding to unnecessary factors have a value of zero, and a second-matrix candidate Pr in which all elements in one or more rows corresponding to unnecessary factors have a value of zero, can be prepared due to the effect of the regularization which induces sparsity of the solution. However, if the value of the regularization parameter is too small, the number of columns having non-zero values (i.e., the estimated factor number K) in the matrix S will be too large, causing the problem of "overfitting" (also called the "overtraining", which is a situation in which even a model that is unreasonable and incorrect shows a high level of goodness of fit with data in question if the used model is complex). Conversely, if the value of the regularization parameter is too large, the estimated factor number K will be too small, causing the problem of "underfitting" (or "undertraining") which prevents the model from being satisfactorily fitted to the data.

According to the present invention, one pair of candidates (Sr, Pr) is determined for each of the plurality of regularization-parameter candidates λr in the matrix candidate determination process. The processes from the probability distribution transform process through the matrix determination process are performed on those candidates (Sr, Pr) to narrow down the candidates using the goodness of fit with an ideal distribution (this will be described later in detail) and ultimately obtain one pair of the first matrix S and second matrix P (and one factor number K corresponding to them). Thus, both the overfitting and underfitting are prevented. In other words, the setting of a factor number K larger than the actual number of components can be prevented, and the first matrix S and second matrix P having an appropriate factor number K can be determined.

Commonly known examples of the regularization function for inducing sparsity of the solution include "L1-norm", "linear combination of L1-norm and L2-norm", and "volume constraint". In the regularization function R(S, P) in the present invention, the linear combination of L1-norm and L2-norm is expressed by $R(S, P)=\alpha(|S|_1+|P|_1)+(1-\alpha)(|S|_2^2+|P|_2^2)$, where $|S|_1=\Sigma_{i,j}S_{i,j}$, $|P|_1=\Sigma_{i,j}P_{i,j}$, $|S|_2=(\Sigma_{i,j}S_{i,j}^2)^{1/2}$, $|P|_2=(\Sigma_{i,j}P_{i,j}^2)^{1/2}$, and α is a constant between 0 and 1. L1-norm corresponds to the case of α=1. In the "volume constraint", a constraint is placed on the solution so that the total of the values in each column of the matrix P does not exceed 1, and a trace norm (Schatten-1-norm), $det|S^TS|$ or $log\ det|S^TS+\delta I|$ is applied to the matrix S (where I is a unit matrix, and δ is a hyperparameter for controlling the regularization function).

The cumulative distribution function of the probability distribution (this function is hereinafter expressed as f(x) using a generalized variable x) is a function given by the following equation:

$$f(x)=\int_{-\infty}^{x}p(x')dx'$$

where p(x) is a probability density function expressing the probability distribution of the data on which f(x) is based. Examples of the probability density function p(x) include the previously mentioned functions: (i) Gaussian distribution, (ii) Poisson distribution, (iii) exponential distribution, and (iv) Tweedie distribution. The cumulative distribution functions f(x) corresponding to the four aforementioned examples of the probability density functions p(x) respectively correspond to (i) Euclidean distance, (ii) generalized KL divergence, (iii) IS divergence and (iv) β divergence mentioned earlier.

The transformed value $y_{nm}=F_{nm}(X_{nm}|(SrPr)_{nm})$ obtained in the probability distribution transform process is determined so that a variable transform is achieved in which the probability distribution Pnm corresponding to each matrix element $X_{nm}$ of the data and each matrix element $(SrPr)_{nm}$ of the product SrPr is transformed into a common probability distribution Pcommon. For example, when the generalized KL divergence is used as the distance function, the corresponding probability distribution Pnm becomes a Poisson distribution. In this case, it is possible to obtain Pcommon in the form of a standard uniform distribution by using a cumulative distribution function as $F_{nm}$, utilizing the fact that any random variable shows a standard uniform distribution after being subjected to a variable transform using a cumulative distribution function (this fact is known as a "probability integral transform"). The more appropriate the matrix factorization is, the higher the goodness of fit is between the empirical distribution function formed by the transformed value $y_{nm}$ after the variable transform into the standard uniform distribution and the cumulative distribution function of the assumed probability distribution Pcommon. Accordingly, in the goodness-of-fit calculation process, the goodness of fit between the transformed value $y_{nm}$ and the cumulative distribution function of the probability distribution Pcommon is determined for each of the plurality of regularization-parameter candidates λr. As for the goodness of fit, any known type of goodness of fit can be used, such as a Kolmogorov-Smirnov statistic. As another specific example, when the variance $\sigma_{nm}^2$ of the noise in each matrix element $X_{nm}$ of the data is previously known, the probability distribution Pcommon can be defined as a standard normal distribution, the cumulative distribution function $F_{nm}(X_{nm}|(SrPr)_{nm})$ can be defined as $(X_{nm}-(SrPr)_{nm})/\sigma_{nm}$, and $|\sigma_y^2-1|$ can be used as the goodness of fit, where $\sigma_y^2$ is given by:

$$\sigma_y^2 = \frac{1}{NM-1}\sum_{n,m}y_{nm}^2$$

which is the unbiased variance of the transformed value $y_{nm}$ whose mean value is assumed to be zero. The goodness of fit in this example indicates whether or not the unbiased variance is close to 1.

After the goodness of fit has been calculated in the previously described manner, the matrix determination process is performed to select, as the first matrix S and second matrix P, the first-matrix candidate Sr and second-matrix candidate Pr determined for (i) a regularization-parameter candidate λr that yields the highest value of the goodness of fit or (ii) a regularization-parameter candidate λr that yields the goodness of fit higher than a predetermined threshold and also has the largest value of the regularization parameter. Condition (ii) is based on the reasoning that a simpler model (having a smaller value of K) is likely to yield a more accurate result, provided that its goodness of fit is at a certainly high level (equal to or higher than a predetermined threshold).

Advantageous Effects of Invention

According to the present invention, a spectrum matrix (first or second matrix) and profile matrix (second or first matrix) whose factor number K is appropriate and close to the number of components contained in a sample can be determined based on a data matrix X obtained by a measurement on the sample, even when the number of components is unknown.

BRIEF DESCRIPTION OF DRAWINGS

FIG. 10 is a data matrix X with N rows and M columns created by a matrix creator.

FIG. 11 is spectrum matrix S and profile matrix P determined by a matrix factorization executor.

DESCRIPTION OF EMBODIMENTS

One embodiment of the data analysis method according to the present invention, and a chromatograph mass spectrometer in which the data analysis method is carried out, are hereinafter described using FIGS. 1-9.

Figure 1:
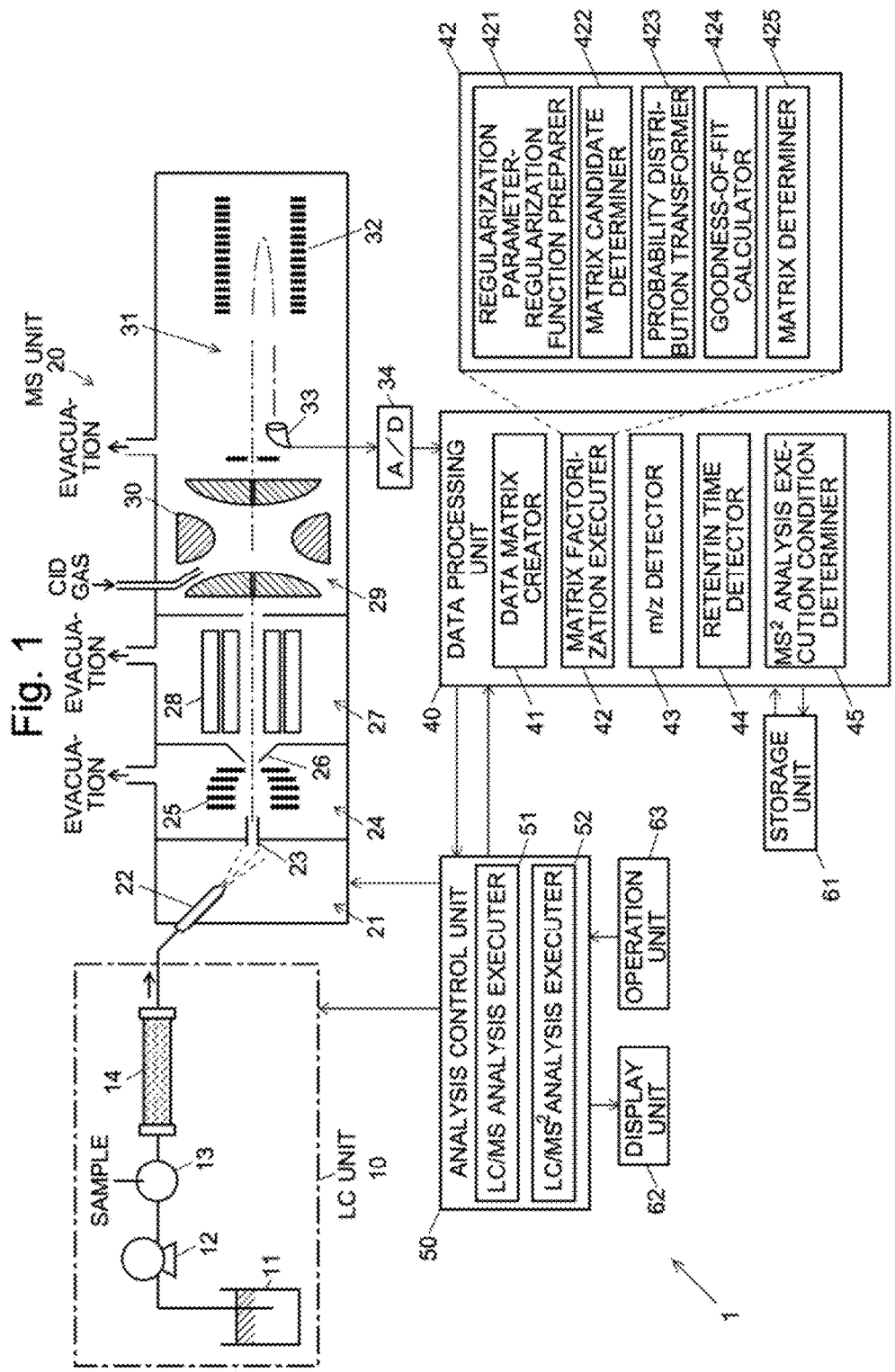
FIG. 1 is a schematic configuration diagram showing one embodiment of a chromatograph mass spectrometer in which a data analysis method according to one embodiment of the present invention is carried out.

(1) Configuration of Chromatograph Mass Spectrometer in which Data Analysis Method According to Present Embodiment is Carried Out FIG. 1 shows the configuration of the main components of a liquid chromatograph/ion trap time-of-flight mass spectrometer (LC/IT-TOFMS) 10 in which the data analysis method according to the present embodiment is carried out. This LC/IT-TOFMS 1 is roughly divided into a liquid chromatograph (LC) unit 10, mass spectrometry (MS) unit 20, data processing unit 40 and analysis control unit 50.

The LC unit 10 includes a mobile phase container 11, liquid supply pump 12, injector 13, and column 14. The mobile phase container 11 is used for storing a mobile phase. The liquid supply pump 12 is configured to draw the mobile phase from the mobile phase container 11 and supply it to the injector 13 at a constant flow rate. The injector 13, which includes an autosampler, is configured to automatically select one of the prepared samples and injects a predetermined volume of the sample into the mobile phase at a predetermined timing. When a sample is injected from the injector 13 into the mobile phase, the sample is carried by the mobile phase and introduced into the column 14. While the sample is passing through the column 14, the various components in the sample are separated from each other and exit from the outlet end of the column 14 in a temporally separated form, to be introduced into the MS unit 20.

The MS unit 20 includes an ionization chamber 21 to be maintained at atmospheric pressure, and an analysis chamber 29 to be maintained at a high degree of vacuum by being evacuated by a turbo molecular pump (not shown). A first-stage intermediate vacuum chamber 24 and second-stage intermediate vacuum chamber 27, with their degrees of vacuum increased in a stepwise manner, are provided between the ionization chamber 21 and analysis chamber 29. The ionization chamber 21 communicates with the first-stage intermediate vacuum chamber 24 through a thin desolvation tube 23. The first-stage intermediate vacuum chamber 24 communicates with the second-stage intermediate vacuum chamber 27 through an orifice of a small diameter bored at the apex of a conical skimmer 26. A first ion guide 25 and second ion guide 28 are arranged within the first-stage intermediate vacuum chamber 24 and second-stage intermediate vacuum chamber 27, respectively.

The ionization chamber 21 is equipped with an ESI nozzle 22 as the ion source. The ESI nozzle 22 is configured to be supplied with an eluate containing sample components from the LC unit 10 and spray the eluate into the ionization chamber 21 in the form of droplets while electrically charging the droplets by a high DC voltage applied from a high voltage source (not shown). The electrically charged droplets collide with gas molecules of atmospheric origin and are thereby broken into even smaller droplets, which are quickly dried (desolvated), leaving sample molecules in a gas state. Those sample molecules are ionized through ion evaporation. The droplets containing the resultant ions are drawn into the desolvation tube 23 by the pressure difference between the ionization chamber 21 and the first-stage intermediate vacuum chamber 24. While passing through the desolvation tube 23, the droplets further undergo desolvation and produce more ions. It should be noted that the method for ionizing sample molecules is not limited to the electrospray ionization (ESI) described in this paragraph; for example, an atmospheric pressure chemical ionization (APCI) or atmospheric pressure photoionization (APPI) can also be used.

The ions which have passed through the desolvation tube 23 travel through the first-stage and second-stage intermediate vacuum chambers 24 and 27 while being converged by the first and second ion guides 25 and 28, and are sent into the analysis chamber 29.

The analysis chamber 29 contains an ion trap 30, time-of-flight mass separator (TOF) 31 as the mass separator, and ion detector 33.

Within the ion trap 30, the ions are temporarily captured and accumulated by a quadrupole electric field created by radio-frequency voltages respectively applied from a power source (not shown) to the electrodes. The various ions accumulated within the ion trap 30 are simultaneously given kinetic energy at a predetermined timing and thereby ejected from the ion trap 30 into the TOF 31.

Additionally, as shown in FIG. 1, the ion trap 30 can be supplied with a collision induced dissociation (CID) gas, such as argon. This allows the ions accumulated within the ion trap 30 to be fragmented into product ions by CID. In the case of an $MS^2$ analysis, after the various ions have been accumulated within the ion trap 30, the voltages applied to the electrodes are controlled so that an ion having a specific m/z among those ions will be selectively retained as a precursor ion. The CID gas is subsequently introduced into the ion trap 30 to promote the fragmentation of the precursor ion. The resultant product ions are simultaneously ejected from the ion trap 30 toward the TOF 31 at a predetermining timing.

The TOF 31 includes a reflectron electrode 32 to which a DC voltage is applied from a DC power source (not shown).

Due to the effect of the thereby created DC electric field, the ions are returned and reach the ion detector 33. Among the ions which have been simultaneously ejected from the ion trap 30, an ion having a smaller m/z flies at a higher speed. Consequently, the ions separately reach the ion detector 33, having temporal differences according to their m/z values. The ion detector 33 produces, as a detection signal, an electric current corresponding to the number of ions arriving at the detector.

An analogue-to-digital (A/D) converter 34 for converting the detection signal into a digital value is connected to the ion detector 33. After the conversion by the A/D converter 34, the detection signal is sent to the data processing unit 40.

The data processing unit 40 includes a data matrix creator 41, matrix factorization executer 42, m/z detector 43, retention time detector 44, and $MS^2$ analysis execution condition determiner 45. The matrix factorization executer 42 includes a regularization parameter-regularization function preparer 421, matrix candidate determiner 422, probability distribution transformer 423, goodness-of-fit calculator 424, and matrix determiner 425. Details of those components will be described later. The data processing unit 40 is connected to a storage unit 61.

The analysis control unit 50 is configured to control the components of the LC unit 10 and MS unit 20 so as to perform an LC/MS analysis and $LC/MS^2$ analysis. It includes an LC/MS analysis executer 51 and $LC/MS^2$ analysis executer 52.

The data processing unit 40 and analysis control unit 50 are embodied by a personal computer (PC) on which predetermined controlling-and-processing software is installed. The storage unit 61 is embodied by a hard disk drive, solid state drive or other types of storage devices provided in or for the PC. The PC also has a display unit 62 as well as an operation unit 63 including a keyboard, mouse, touch panel and/or other devices.

Figure 2:
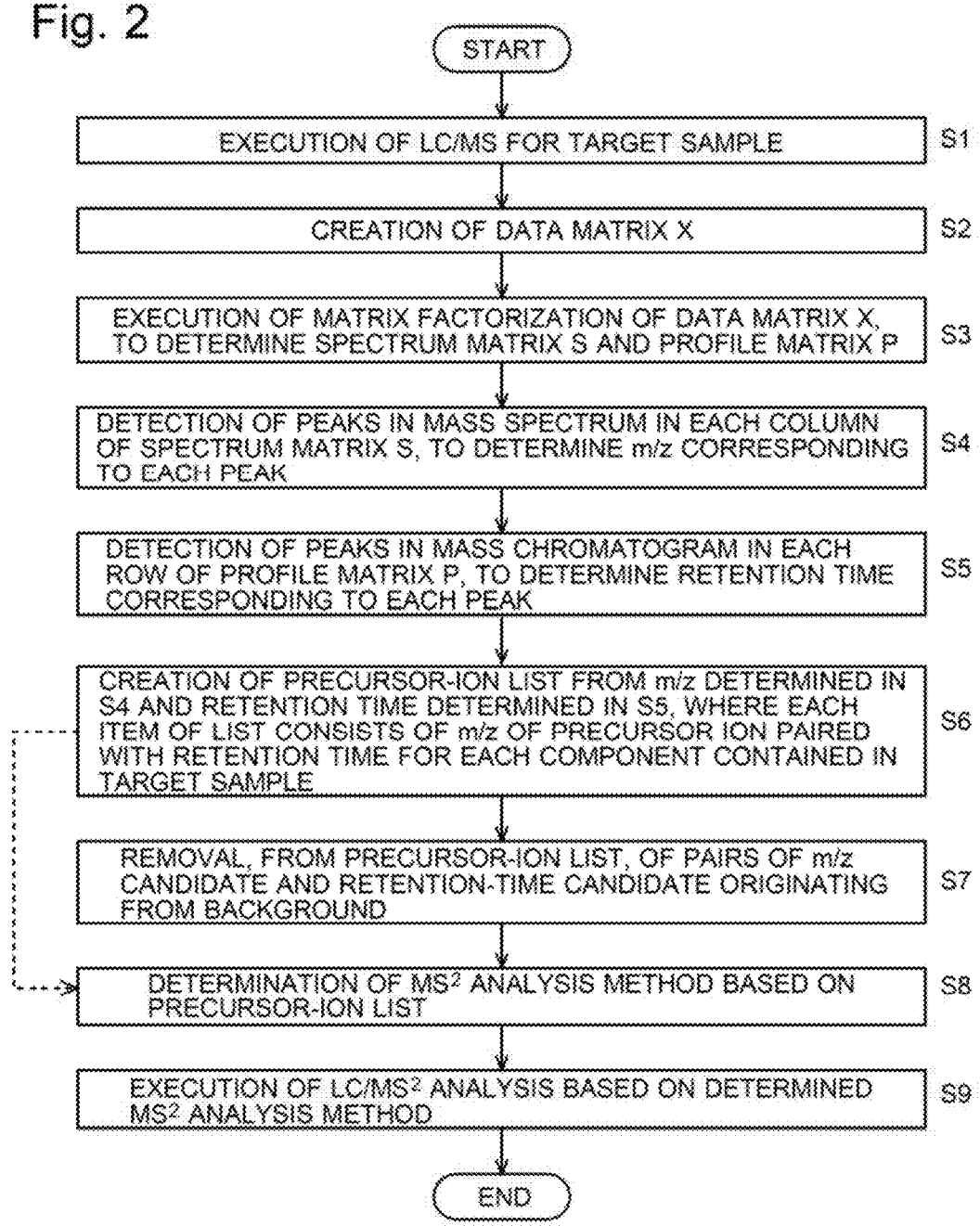
FIG. 2 is a flowchart showing an operation of the chromatograph mass spectrometer shown in FIG. 1.
Figure 3:
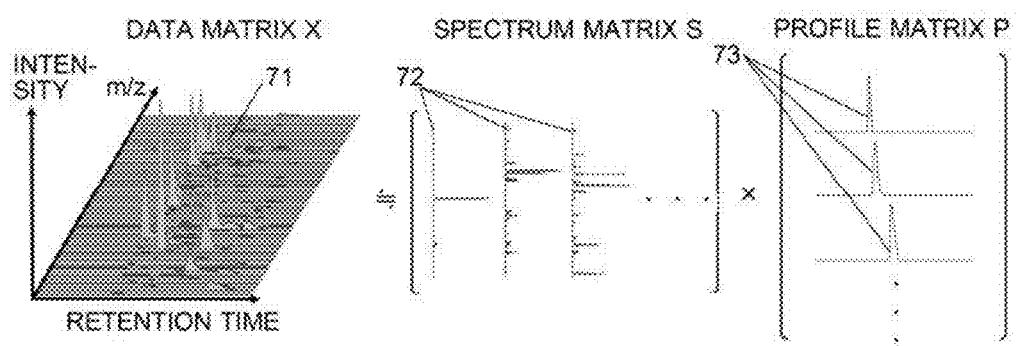
FIG. 3 is a diagram conceptually illustrating a data matrix as well as a spectrum matrix and profile matrix, using one example of the three-dimensional data as well as the data of mass spectra and chromatograms.

(2) Operation of LC/IT-TOFMS 1 Including Data Processing Method According to Present Embodiment An operation of the LC/IT-TOFMS 1 including the data analysis method according to the present embodiment is hereinafter described using FIGS. 2 and 3. The functions of the components in the data processing unit 40 will also be described.

Initially, an operator using the operation unit 63 performs a predetermined operation to initiate a measurement. In response to this operation, the LC/MS analysis executer 51 in the LC/IT-TOFMS 1 begins to control the components of the LC/IT-TOFMS 1 to conduct an LC/MS analysis for a target sample, as will be described later (Step 1). The target sample injected from the injector 13 into the mobile phase is thereby sent into the column 14, and the eluate from the column 14 is introduced into the MS unit 20, which repeatedly performs a mass spectrometric analysis of the eluate. The detection signals produced by the ion detector 33 in the MS unit 20 are converted into digital values by the A/D converter 34 and sent to the data matrix creator 41 in the data processing unit 40.

In the data matrix creator 41, N signals obtained at each m/z within a predetermined m/z range as a result of one ejection of ions from the ion trap 30 are acquired as the values of N matrix elements to be included in one column of a data matrix X with N rows and M columns. The data acquisition is similarly performed for each of the M ejections of ions performed at intervals of time. Based on those data, the data matrix X with N rows and M columns as shown in FIG. 10 is created (Step 2).

Each matrix element $X_{nm}$ of the data matrix X (where n is an integer from 1 to N, while m is an integer from 1 to M) indicates the intensity detected at the n-th m/z within the aforementioned m/z range as well as at the m-th ion ejection (which corresponds to the retention time). Each matrix element $X_{nm}$ of the data matrix X has a value of zero or positive value (non-negative value).

Next, the matrix factorization executer 42 performs a matrix factorization by a method which will be described later (in "(3) Details of Data Analysis Method (Operation of Matrix Factorization) According to Present Embodiment") to determine a spectrum matrix S with N rows and K columns as well as a profile matrix (also called a "chromatogram matrix") P with K rows and M columns so that their product SP approximates to the data matrix X (Step 3). The spectrum matrix S corresponds to the first matrix S mentioned earlier, while the profile matrix P corresponds to the second matrix P. The spectrum matrix S and profile matrix P can be expressed as shown in FIG. 11:

Each matrix element $s_{nk}$ of the spectrum matrix S (where n is an integer from 1 to N, while k is an integer from 1 to K) indicates the intensity at one m/z value in a mass spectrum originating from one of the K components contained in a sample (this component is hereinafter called the "k-th component"). Similarly, each matrix element $p_{km}$ of the profile matrix P indicates the intensity at one retention time in the chromatogram originating from the k-th component. In other words, each set of matrix elements surrounded by the broken line in the above spectrum matrix S shows a mass spectrum of one component, while each set of matrix elements surrounded by the broken line in the above profile matrix P shows a chromatogram of one component. Each of the matrix elements $s_{nk}$ of the spectrum matrix S and the matrix elements $p_{km}$ of the profile matrix P has a value of zero or positive value (non-negative value). FIG. 3 conceptually illustrates the data matrix X as well as the spectrum matrix S and profile matrix P, using one example of the three-dimensional data 71 as well as the data of the mass spectra 72 and chromatograms 73.

Next, the m/z detector 43 performs a peak-detecting operation for each column of the obtained spectrum matrix S (i.e., for each value of k from 1 to K), including the steps of detecting one or more peaks from the mass spectrum in the k-th column of the spectrum matrix S and determining the m/z values corresponding to those peaks (Step 4). The m/z values corresponding to those peaks will be the candidates of the m/z value of the precursor ion originating from the k-th component contained in the target sample. Similarly, the retention time detector 44 performs a peak-detecting operation for each row of the obtained profile matrix P (i.e., for each value of k from 1 to K), including the steps of detecting one or more peaks from the chromatogram in the k-th row of the profile matrix P and determining the retention times corresponding to those peaks (Step 5). The retention times corresponding to those peaks will be the candidates of the retention time of the k-th component contained in the target sample.

Based on the candidates of the m/z in the k-th column of the spectrum matrix S obtained in Step 4 and those of the retention time in the k-th row of the profile matrix P obtained in Step 5, the $MS^2$ analysis execution condition determiner 45 creates a precursor-ion list L for each value of k from 1 to K (i.e., for each component contained in the target sample), where each item of the list consists of one candidate of the m/z of the precursor ion paired with one candidate of the retention time (Step 6).

In the case where the LC/MS data of a background with no sample has been acquired beforehand, the $MS^2$ analysis execution condition determiner 45 may additionally perform, based on the background data, a selecting operation in which all pairs of the m/z candidate and retention-time candidate originating from the background are removed from the precursor-ion list L, and the remaining candidate pairs are selected as new pairs of the m/z candidate and retention-time candidate (Step 7). As another possibility, the previously described operation in Step 7 may be replaced by a selecting operation based on the background data in which only the pairs of the m/z candidate and retention-time candidate that fall within an m/z range and retention-time range which are free from the influence of the background are selected as new pairs of the m/z candidate and the retention-time candidate. These operations in Step 7 may be omitted.

Based on the obtained precursor-ion list L (after the removal of the pairs of the m/z candidate and retention-time candidate originating from the background if Step 7 is carried out), the $MS^2$ analysis execution condition determiner 45 determines execution conditions of an $MS^2$ analysis ($MS^2$ analysis method) including the selection and fragmentation of the precursor ion of a component contained in the sample (Step 8). In most $MS^2$ analyses, this type of analysis method is previously known for each component. Therefore, the known analysis methods can be previously stored in the storage unit 61 so that the $MS^2$ analysis execution condition determiner 45 can retrieve an appropriate analysis method from the storage unit 61 based on the information concerning the candidates of the m/z and retention time in the precursor-ion list L.

In the process of determining an analysis method, the analysis method for an $MS^2$ analysis of one sample may be divided into a plurality of analysis methods so that the loop time (sampling interval) for one $MS^2$ analysis will be equal to or less than a predetermined value. This ensures a sufficiently high sampling rate and improves the sensitivity of the quantitative determination.

The process of determining an analysis method may allow the setting of a different level of collision energy for each component to be analyzed. This allows an analysis of each component to be more appropriately performed when an appropriate level of collision energy for each component is previously known. As another possibility, a plurality of levels of collision energy may be set for each component to be analyzed. This allows an analysis to be performed using multiple levels of collision energy to determine an optimum fragmentation condition when an appropriate level of collision energy for each component is unknown.

Based on the analysis method thus determined, the $LC/MS^2$ analysis executer 52 in the LC/IT-TOFMS 1 controls each component of the LC/IT-TOFMS 1 to perform an $LC/MS^2$ analysis (Step 9). The $LC/MS^2$ analysis is performed at all retention times included in the precursor-ion list L. After the $LC/MS^2$ analyses at all retention times have been completed, the entire sequence of operations of the LC/IT-TOFMS 1 is discontinued.

Figure 4:
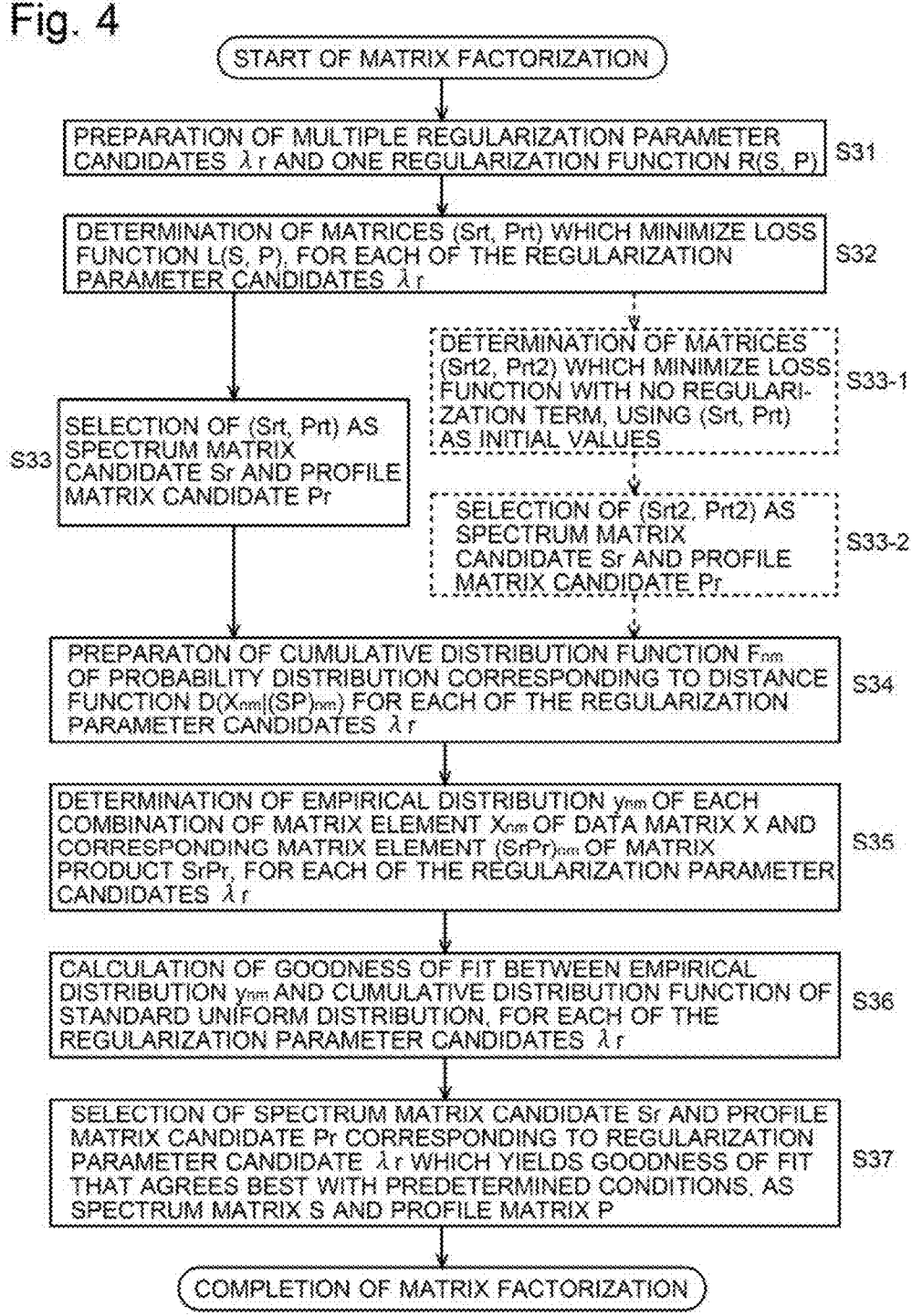
FIG. 4 is a flowchart showing details of an operation in the data analysis method according to the present embodiment, which is a portion of the operation of the chromatograph mass spectrometer shown in FIG. 1.

(3) Details of Data Analysis Method (Operation of Matrix Factorization) According to Present Embodiment Next, using FIG. 4, details of the operation of the matrix factorization (Step 3) which is a data analysis method according to the present embodiment and is performed in the matrix factorization executer 42 will be described along with the functions of the components in the matrix factorization executer 42.

Initially, the regularization parameter-regularization function preparer 421 prepares a plurality of regularization-parameter candidates $\lambda r$ (in the present case, there are b candidates, where b is a natural number) and one regularization function R(S, P) (Step 31; regularization parameter-regularization function preparation process). The regularization function R(S, P) used in the present embodiment is the sum of the L1-norm of the matrix S and that of the matrix P, i.e., $R(S, P)=|S|_1+|P|_1$. The L1-norm of a matrix means the sum of all matrix elements in the matrix. As for the regularization-parameter candidates $\lambda r$, a plurality of positive real numbers are appropriately selected.

Next, for each of the b regularization-parameter candidates $\lambda r$, the matrix candidate determiner 422 determines spectrum and profile matrices Srt and Prt which minimize the value of the loss function $L(S, P)=D(X|SP)+\lambda rR(S, P)$ (Step 32). The distance function $D(X|SP)=\Sigma_{n,m}D(X_{nm}|(SP)_{nm})$ is the total of the distances between the matrix elements $X_{nm}$ of the data matrix X and the corresponding matrix elements $(SP)_{nm}$ of the product SP. This function represents the degree of difference between the matrix elements of the data matrix X and those of the product SP. In the present embodiment, the generalized KL divergence $D_{KL}(x|y)=x \log(x/y)-(x-y)$ is used as the distance function $D(x|y)$ for each element.

The matrix candidate determiner 422 further determines a spectrum matrix candidate (first-matrix candidate) Sr and profile matrix candidate (second-matrix candidate) Pr for each regularization-parameter candidate $\lambda r$ by one of the following two methods (matrix candidate determination process). In the first method, the combination of the temporary candidates (Srt, Prt) are directly selected as a spectrum matrix candidate Sr and profile matrix candidate Pr (Step 33).

In the second method, the following operations are performed in place of Step 33. Using Srt and Prt as the initial values, matrices Srt2 and Prt2 which minimize the value of a second loss function having no regularization term, $L_2(S, P)=D(X|SP)$, are determined (Step 33-1). These matrices Srt2 and Prt2 are selected as a spectrum matrix candidate Sr and profile matrix candidate Pr (Step 33-2).

After the combination (Sr, Pr) of the candidates of the spectrum matrix S and profile matrix P has been determined by one of the two methods, the probability distribution transformer 423 prepares a cumulative distribution function $F_{nm}$ of the probability distribution corresponding to the distance function $D(X_{nm}|(SP)_{nm})$ for each of the b regularization-parameter candidates $\lambda r$ (Step 34). Then, for each of the b regularization-parameter candidates $\lambda r$ as well as for each combination $(X_{nm}, (SrPr)_{nm})$ of the matrix element $X_{nm}$ of the data matrix X and the corresponding matrix element $(SrPr)_{nm}$ of the product SrPr of the spectrum matrix candidate Sr and profile matrix candidate Pr, the probability distribution transformer 423 substitutes the values of those matrix elements into the cumulative distribution function $F_{nm}$ to determine $y_{nm}=F_{nm}(X_{nm}|(SrPr)_{nm})$ which is expected to show a standard uniform distribution (Step 35). It is commonly known that the cumulative distribution function $F(X|SP)$ corresponding to the generalized KL divergence $D_{KL}(X|SP)=X \log(X/SP)-(X-SP)$, which is the loss function used in the present embodiment, is a cumulative distribution function of a Poisson distribution.

Next, the goodness-of-fit calculator 424 calculates the goodness of fit between the empirical distribution $y_{nm}=F_{nm}(X_{nm}|(SrPr)_{nm})$ determined by the probability distribution transformer 423 for each of the b regularization-parameter candidates $\lambda r$ and the cumulative distribution function of a standard uniform distribution (Step 36; goodness-of-fit calculation process). For the calculation of the goodness of fit, commonly known methods for calculating the goodness of fit in statistics are available, such as a Kolmogorov-Smirnov (KS) statistic, Cramer-von Mises statistic, or Anderson-Darling statistic.

Subsequently, the matrix determiner 425 compares the values of the goodness of fit respectively calculated for the regularization-parameter candidates λr, and selects, as the spectrum matrix S and profile matrix P, the spectrum matrix candidate Sr and profile matrix candidate Pr corresponding to the regularization-parameter candidate λr which yields the highest value of the goodness of fit (Step 37; matrix determination process). In place of the spectrum and profile matrices corresponding to the regularization-parameter candidate λr which yields the highest value of the goodness of fit, the spectrum matrix candidate Sr and profile matrix candidate Pr corresponding to the largest value of the regularization parameter λr among the regularization-parameter candidates λr which yield the values of the goodness of fit equal to or greater than a predetermined threshold may be selected as the spectrum matrix S and profile matrix P. Thus, the operation of the matrix factorization is completed.

(4) Example of Calculation of Matrix Factorization

Figure 5:
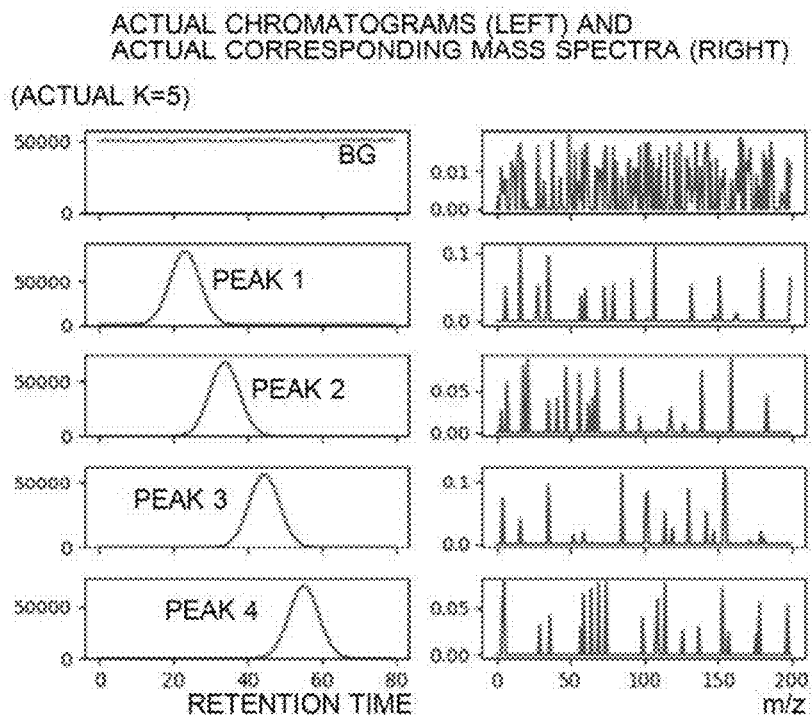
FIG. 5 is a diagram showing measurement data in the form of chromatograms and mass spectra which give the data matrix used in an example of the calculation of the matrix factorization performed in the data analysis method according to the present embodiment.

An example of the calculation of the matrix factorization using the chromatograms shown in the left section of FIG. 5 and the mass spectra shown in the right section of FIG. 5 is hereinafter described. In the left section of the drawing, a chromatogram acquired by one measurement is divided into five chromatograms showing four peaks originating from four components and the background (BG). Each of the five chromatograms corresponds to one row of a data matrix. Accordingly, in the present example, the value of K in the actual data (obtained by an experiment) is five. The right section of FIG. 5 shows five mass spectra which correspond to the five chromatograms, respectively.

Figure 6:
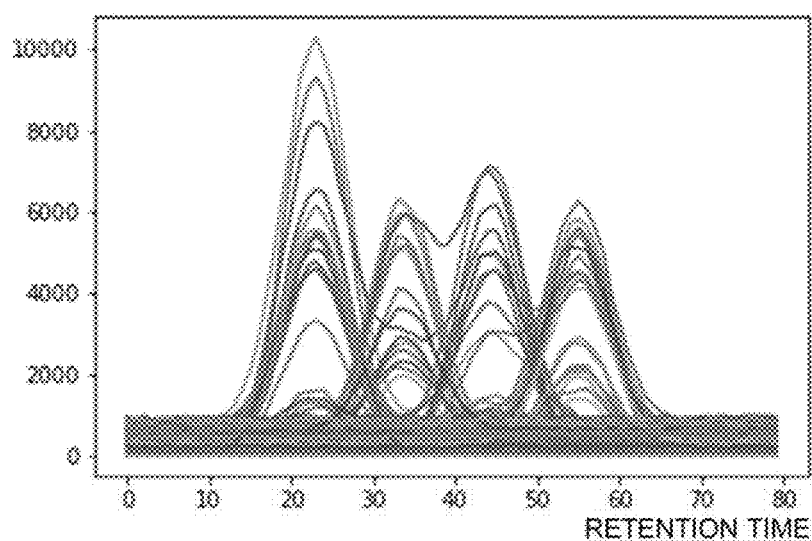
FIG. 6 is a diagram in which measurement data which give a data matrix is shown as a superposition of a plurality of mass chromatograms.

FIG. 6 shows a large number of mass chromatograms acquired at different m/z values from the actual data (obtained by an experiment). This diagram shows the entire information held in the data matrix X. More specifically, one set of intensity values at a number of retention times in one mass chromatogram corresponds to one set of values of the matrix elements in one row of the data matrix X. On the other hand, one set of intensity values on the large number of mass chromatograms at one retention time corresponds to one set of values of the matrix elements in one column of the data matrix X.

For this data matrix X, a spectrum matrix candidate Sr and profile matrix candidate Pr were determined for three values of λr (1, 256 and 512) by the matrix factorization according to the present embodiment, and the goodness of fit was calculated for each case.

Figure 7:
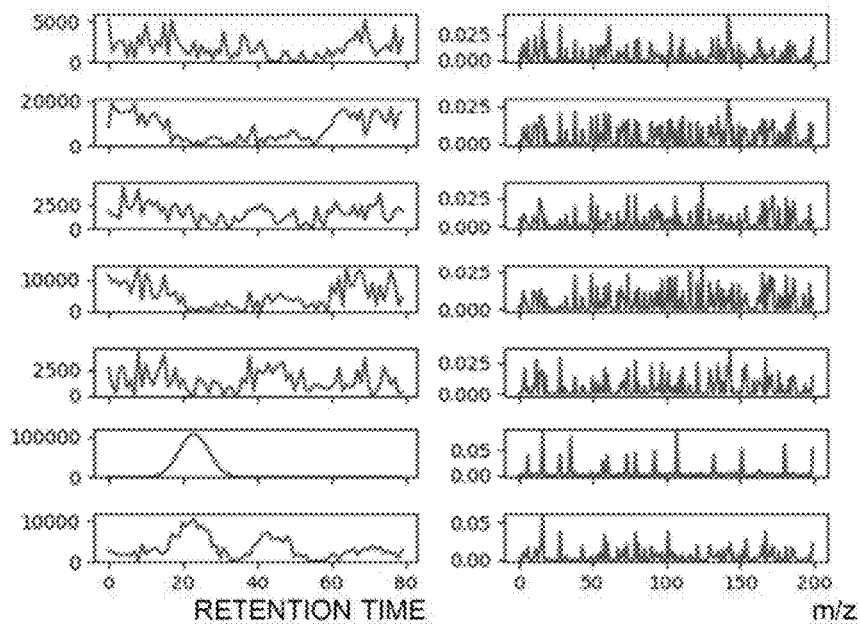
FIG. 7 is a diagram showing an example of the result of a calculation of mass spectra and chromatograms obtained in a matrix factorization in which the regularization is insufficient due to λr being too small.
Figure 8:
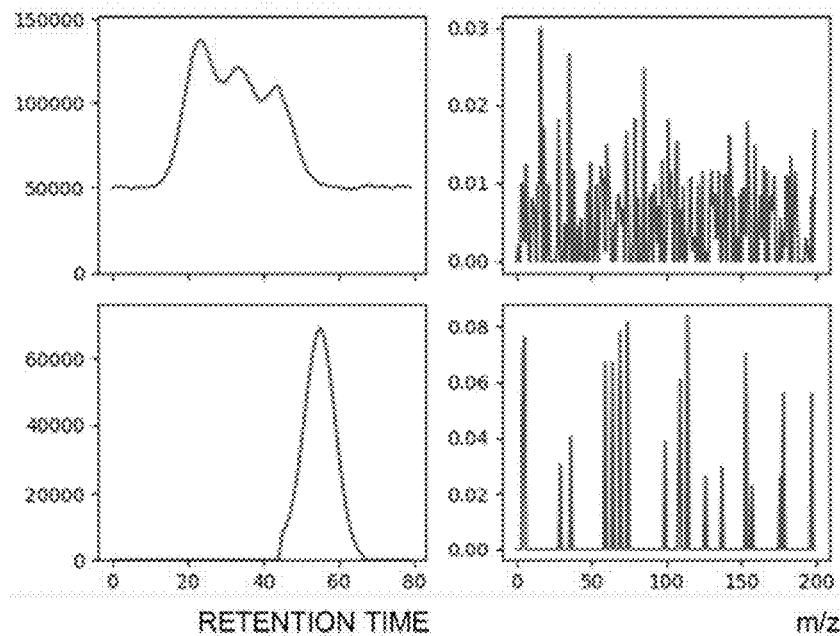
FIG. 8 is a diagram showing an example of the result of a calculation of mass spectra and chromatograms obtained in a matrix factorization in which the regularization is insufficient due to λr being too large.
Figure 9:
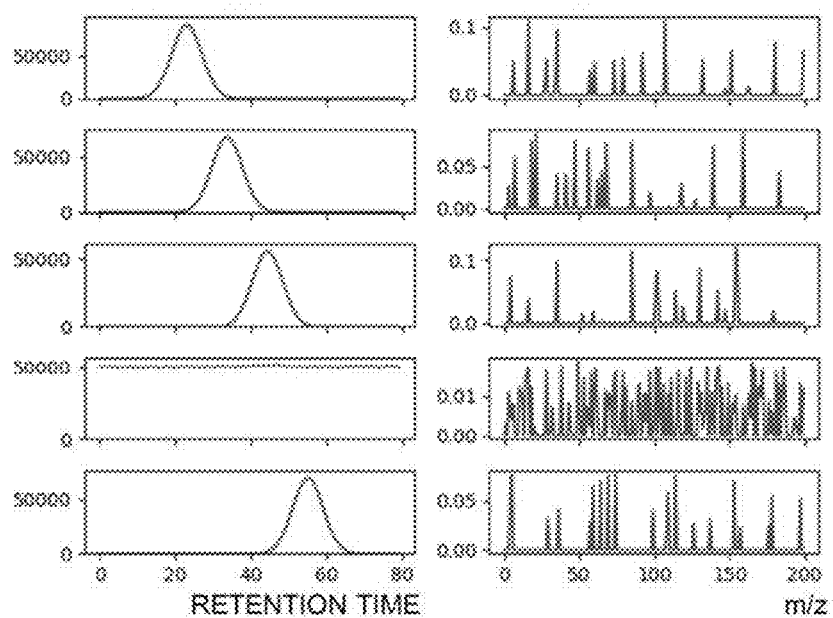
FIG. 9 is a diagram showing an example of the result of a calculation of mass spectra and chromatograms obtained in a matrix factorization in which the regularization is appropriately performed using an optimum value of λr.

FIG. 7 shows the result obtained in the case of λr=1, where the chromatograms (left section) correspond to the rows of the matrix elements of the profile matrix candidate Pr, while the mass spectra (right section) correspond to the columns of the matrix elements of the spectrum matrix candidate Sr. Similarly, FIG. 8 shows chromatograms and mass spectra obtained in the case of λr=512, and FIG. 9 shows chromatograms and mass spectra obtained in the case of λr=256. The calculated value of the KS statistic is also shown in FIGS. 7-9. The KS statistic is a numerical value obtained by the Kolmogorov-Smirnov (KS) test. The smaller the numerical value is, the higher the goodness of fit is.

In the case of λr=1 (FIG. 7), the KS statistic is 0.0924. The value of K in the determined profile matrix candidate Pr and spectrum matrix candidate Sr is 7, which is greater than the actual value (K=5). This means that the regularization was insufficient due to the too small value of λr. As a matter of fact, it is obvious that the obtained chromatograms and mass spectra do not agree with the actual data (FIG. 5).

In the case of λr=512 (FIG. 8), the KS statistic is 0.2652. The value of K in the determined profile matrix candidate Pr and spectrum matrix candidate Sr is 2, which is smaller than the actual value. This means that the regularization had an excessive effect due to the too large value of λr. It is obvious that the obtained chromatograms and mass spectra do not agree with the actual data (FIG. 5).

On the other hand, in the case of λr=256 (FIG. 9), the KS statistic is 0.0164, which is the lowest value among the three candidates. This means the highest goodness of fit among the three candidates. Accordingly, the profile matrix candidate Pr and spectrum matrix candidate Sr in the case of λr=256 should be selected as the profile matrix P and spectrum matrix S from the three candidates. The value of K in the obtained profile matrix candidate Pr and spectrum matrix candidate Sr is 5, which agrees with the actual data. The chromatograms and mass spectra obtained from the profile matrix P and spectrum matrix S are approximate to the actual data (FIG. 5).

In the previously described example, there were three regularization-parameter candidates λr, from each of which a profile matrix candidate Pr and spectrum matrix candidate Sr were obtained and shown in the form of chromatograms and mass spectra. The number of regularization-parameter candidates λr is not limited to three. The larger the number of the regularization-parameter candidates λ is, the more accurate the ultimately obtained profile matrix P and spectrum matrix S will be.

(5) Other Notes

In the previous embodiment, the data matrix X is defined as a matrix with N rows and M columns, the spectrum matrix S is defined as a matrix with N rows and K columns, and the profile matrix P is defined as a matrix with K rows and M columns It is also possible to define the data matrix X as a matrix with M rows and N columns, the spectrum matrix S as a matrix with K rows and N columns, and the profile matrix P as a matrix with M rows and K columns. In that case, the profile matrix P corresponds to the first matrix, and the spectrum matrix S corresponds to the second matrix. The product PS should be used in place of the product SP (it should be noted that S and P in the present context do not represent the first and second matrices, but the spectrum and profile matrices in the present example).

The configuration of the chromatograph mass spectrometer is not limited to that of the previously described TOFMS 1. For example, the present invention can also be applied in a chromatograph mass spectrometer which includes the combination of a mass filter (e.g., a quadrupole mass filter) and a collision cell in place of the ion trap 30 used in the previous embodiment, as well as an orthogonal acceleration TOF in place of the TOF 31 used in the previous embodiment. Furthermore, the present invention is not limited to TOFMSs but is also applicable in other types of chromatograph mass spectrometers.

The present invention can also be applied to an analysis of data acquired with an imaging mass spectrometer, imaging FT-IR or similar device other than the data acquired with chromatograph mass spectrometers. In the case of the imaging mass spectrometer, one of the first and second variables is m/z, and the other variable corresponds to a numerical value representing a position. In the case of the imaging FT-IR, one of the first and second variables is absorption wavelength, and the other variable corresponds to a numerical value representing a position.

In addition, it is needless to say that the present invention is not limited to the previous embodiment but can be changed or modified in various forms.

Modes of Invention

A person skilled in the art can understand that the previously described illustrative embodiment is a specific example of the following modes of the present invention.

(Clause 1)

A data analysis method according to Clause 1 is a method for determining a first matrix S with N rows and K columns and a second matrix P with K rows and M columns based on a data matrix X in which a set of data obtained from an analyzing device are arranged in N rows and M columns, where the N rows of data differ from each other in the value of a first variable, the M columns of data differ from each other in the value of a second variable, and the first matrix S and the second matrix P are determined so that the product SP approximates to the data matrix X, the method including:

a regularization parameter-regularization function preparation process for preparing a plurality of regularization-parameter candidates λr (where r is a natural number from 1 to $r_{max}$) and one regularization function R(S, P) which induces sparsity of the solution;

a matrix candidate determination process for solving an optimization problem for each of the plurality of regularization-parameter candidates λr so as to determine a matrix Srt as a candidate Sr of the first matrix S and a matrix Prt as a candidate Pr of the second matrix P, where the matrices Srt and Prt are determined so as to minimize the value of a loss function L(S, P)=D(X|SP)+λrR(S, P), where D(X|SP) is a distance function expressing the degree of difference between the data matrix X and the product SP, while λrR(S, P) is the product of the regularization-parameter candidate λr and the regularization function R(S, P);

a probability distribution transform process for determining, for each of the plurality of regularization-parameter candidates λr, a transformed value $y_{nm}=F_{nm}(X_{nm}|(SrPr)_{nm})$ by a variable transform into a common probability distribution Pcommon for each combination of a matrix element $X_{nm}$ of the data matrix X and a corresponding matrix element $(SrPr)_{nm}$ of the product SrPr of the first-matrix candidate Sr and the second-matrix candidate Pr, using $F_{nm}$ which is a function for the variable transform from a probability distribution $P_{nm}$ corresponding to the distance function $D(X_{nm}|(SP)_{nm})$ into the common probability distribution Pcommon;

a goodness-of-fit calculation process for determining, for each of the plurality of regularization-parameter candidates λr, a goodness of fit between the transformed value $y_{nm}$ and a cumulative distribution function of the probability distribution Pcommon; and a matrix determination process for selecting, as the first matrix S and the second matrix P, the first-matrix candidate Sr and the second-matrix candidate Pr determined for a regularization-parameter candidate λr which yields the highest value of the goodness of fit among the plurality of regularization-parameter candidates λr, or a regularization-parameter candidate λr which yields the goodness of fit higher than a predetermined threshold and also has the largest value of λr.

By the data analysis method according to Clause 1, a first matrix S and second matrix P whose factor number K is appropriate and close to the number of components contained in a sample can be determined based on a data matrix X obtained by a measurement on the sample, even when the number of components is unknown.

(Clause 2)

In the data analysis method according to Clause 2, the matrix candidate determination process in the data analysis method according to Clause 1 uses the matrix Srt and the matrix Prt as initial values for determining a matrix Srt2 and a matrix Prt2 which minimize the value of a second loss function with no regularization term, L2(S, P)=D(X|SP), and selects the matrix Srt2 and the matrix Prt2 as the first matrix candidate Sr and the second matrix candidate Pr, instead of selecting the matrix Srt and the matrix Prt as the first matrix candidate Sr and the second matrix candidate Pr.

In the data analysis method according to Clause 2, the matrices Srt and Prt which have been determined so as to minimize the value of the loss function L(S, P)=D(X|SP)+λrR(S, P) are used as initial values for making an additional determination for a second optimization which does not include the regularization term. This operation corrects a bias of the residual due to the regularization and enables the selection of first and second matrix candidates Sr and Pr which are closer to the actual data. Consequently, the first and second matrices S and P to be ultimately obtained will be more accurate.

(Clause 3)

In the data analysis method according to Clause 3, which is one mode of the data analysis method according to Clause 1 or 2, the regularization function R(S, P) is L1-norm, or a linear combination of L1-norm and L2-norm, or a function which applies a trace norm, det|$S^TS$| or log det|$S^TS+\delta I$| to the matrix S (where I is a unit matrix, and δ is a hyperparameter for controlling the regularization function) while placing a constraint on the solution so that the total of the values in each column of the matrix P should not exceed 1.

(Clause 4)

In the data analysis method according to Clause 4, which is one mode of the data analysis method according to one of Clauses 1-3, the cumulative distribution function is a function selected from a cumulative distribution function of a Gaussian distribution, a cumulative distribution function of a Poisson distribution, a cumulative distribution function of an exponential distribution, and a cumulative distribution function of a Tweedie distribution.

(Clause 5)

In the data analysis method according to Clause 5, which is one mode of the data analysis method according to one of Clauses 1-4, the goodness of fit is determined by a test selected from a Kolmogorov-Smirnov test, a Cramer-von Mises test, and an Anderson-Darling test.

(Clause 6)

In the data analysis method according to Clause 6, which is one mode of the data analysis method according to one of Clauses 1-4, when the variance $\sigma_{nm}^2$ of the noise in each matrix element $X_{nm}$ is previously known, the probability distribution Pcommon is defined as a standard normal distribution, the cumulative distribution function $F_{nm}(X_{nm}|(SrPr)_{nm})$ is defined as $(X_{nm}-(SrPr)_{nm})/\sigma_{nm}$, and $-|\sigma_y^2-1|$ is used as the goodness of fit, where $\sigma_y^2$ is given by:

$$\sigma_y^2 = \frac{1}{NM-1}\sum_{n,m} y_{nm}^2$$

which is the unbiased variance of the transformed value $y_{nm}$ whose mean value is assumed to be zero.

In the present invention, the various regularization functions R(S, P) mentioned in Clause 3 and the various cumulative functions F(X|SP) mentioned in Clause 4 can be appropriately used. For the calculation of the goodness of fit, the various methods mentioned in Clause 5 or 6, which are commonly known in the area of statistics, can be appropriately used.

(Clause 7)

In the data analysis method according to Clause 7, which is one mode of the data analysis method according to one of Clauses 1-6, the analyzing device is a chromatograph mass spectrometer, one of the first and second variables is m/z, and the other variable is a retention time.

(Clause 8)

In the data analysis method according to Clause 8, which is one mode of the data analysis method according to one of Clauses 1-6, the analyzing device is an imaging mass spectrometer, one of the first and second variables is m/z, and the other variable is a numerical value representing a position.

(Clause 9)

In the data analysis method according to Clause 9, which is one mode of the data analysis method according to one of Clauses 1-6, the analyzing device is an imaging Fourier transform infrared spectrophotometer, one of the first and second variables is absorption wavelength, and the other variable is a numerical value representing a position.

As described in Clauses 7-9, the present invention is suitably applicable to an analysis of data acquired by a chromatograph mass spectrometer, imaging mass spectrometer or imaging Fourier transform infrared spectrophotometer.

REFERENCE SIGNS LIST

1 ... Liquid Chromatograph/Ion Trap Time-of-Flight Mass Spectrometer
10 ... Liquid Chromatograph (LC) Unit
11 ... Mobile Phase Container
12 ... Liquid Supply Pump
13 ... Injector
14 ... Column
20 ... Mass Spectrometry (MS) Unit
21 ... Ionization Chamber
22 ... ESI Nozzle
23 ... Desolvation Tube
24 ... First-Stage Intermediate Vacuum Chamber
25 ... First Ion Guide
26 ... Skimmer
27 ... Second-Stage Intermediate Vacuum Chamber
28 ... Second Ion Guide
29 ... Analysis Chamber
30 ... Ion Trap
31 ... Time-of-Flight (TOF) Mass Separator
32 ... Reflectron Electrode
33 ... Ion Detector
34 ... Analogue-to-Digital (A/D) Converter
40 ... Data Processing Unit
41 ... Data Matrix Creator
42 ... Matrix Factorization Executer
421 ... Regularization Parameter-Regularization Function Preparer
422 ... Matrix Candidate Determiner
423 ... Probability Distribution Transformer
424 ... Goodness-of-Fit Calculator
425 ... Matrix Determiner
43 ... m/z Detector
44 ... Retention Time Detector
45 ... $MS^2$ Analysis Execution Condition Determiner
50 ... Analysis Control Unit
51 ... LC/MS Analysis Executer
52 ... $LC/MS^2$ Analysis Executer
61 ... Storage Unit
62 ... Display Unit
63 ... Operation Unit
71 ... Three-Dimensional Data
72 ... Mass Spectrum
73 ... Chromatogram

The invention claimed is:

1. A mass spectrometer control method comprising:
a data analysis process for determining a first matrix S with N rows and K columns and a second matrix P with K rows and M columns based on a data matrix X in which a set of data of components contained in a sample obtained from a chromatograph mass spectrometer are arranged in N rows and M columns, where the N rows of data differ from each other in a value of a first variable, the M columns of data differ from each other in a value of a second variable, and the first matrix S and the second matrix P are determined so that a product SP approximates to the data matrix X;
a peak detection process for determining peaks in a mass spectrum in each of the K columns of the first matrix S and determining peaks in a mass chromatogram in each of the M columns of the second matrix P;
a precursor-ion list creation process for creating a precursor-ion list based on the peaks in the mass spectrum in each of the K columns of the first matrix S and the peaks in the mass chromatogram in each of the M columns of the second matrix P;
an analysis condition determining process for determining, for each component, a mass spectrometry analysis condition based on the precursor-ion list; and
an analysis execution process for executing liquid chromatography/mass spectrometry analysis based on the mass spectrometry analysis condition,
wherein the data analysis process comprises:
a regularization parameter-regularization function preparation process for preparing a plurality of regularization-parameter candidates λr (where r is a natural number from 1 to $r_{max}$) and one regularization function R(S, P) which induces sparsity of a solution;
a matrix candidate determination process for solving an optimization problem for each of the plurality of regularization-parameter candidates λr so as to determine a matrix Srt as a candidate Sr of the first matrix S and a matrix Prt as a candidate Pr of the second matrix P, where the matrices Srt and Prt are determined so as to minimize a value of a loss function L(S, P) =D(X|SP)+ λrR(S, P), where D(X|SP) is a distance function expressing a degree of difference between the data matrix X and the product SP, while λrR(S, P) is a product of the regularization- parameter candidate λr and the regularization function R(S, P);
a probability distribution transform process for determining, for each of the plurality of regularization-parameter candidates λr, a transformed value $y_{nm}=F_{nm}(X_{nm}|(SrPr)_{nm})$ by a variable transform into a common probability distribution Pcommon for each combination of a matrix element $X_{nm}$ of the data matrix X and a corresponding matrix element $(SrPr)_{nm}$ of a product SrPr of the first-matrix candidate Sr and the second-matrix candidate Pr, using $F_{nm}$ which is a function for a variable transform from a probability distribution $P_{nm}$ corresponding to the distance function $D(X_{nm}|(SP)_{nm})$ into the common probability distribution Pcommon;

a goodness-of-fit calculation process for determining, for each of the plurality of regularization-parameter candidates λr, a goodness of fit between the transformed value $y_{nm}$ and a cumulative distribution function of the probability distribution Pcommon; and a matrix determination process for selecting, as the first matrix S and the second matrix P, the first-matrix candidate Sr and the second-matrix candidate Pr determined for a regularization-parameter candidate λr which yields a highest value of the goodness of fit among the plurality of regularization-parameter candidates λr, or a regularization-parameter candidate λr which yields the goodness of fit higher than a predetermined threshold and also has a largest value of λr.

2. The mass spectrometer control method according to claim 1, wherein the matrix candidate determination process uses the matrix Srt and the matrix Prt as initial values for determining a matrix Srt2 and a matrix Prt2 which minimize a value of a second loss function having no regularization term, $L_2(S, P)=D(X|SP)$, and selects the matrix Srt2 and the matrix Prt2 as the first matrix candidate Sr and the second matrix candidate Pr, instead of selecting the matrix Srt and the matrix Prt as the first matrix candidate Sr and the second matrix candidate Pr.

3. The mass spectrometer control method according to claim 1, wherein the regularization function R(S, P) is L1-norm, or a linear combination of L1-norm and L2-norm, or a function which applies a trace norm, $det|S^T S|$ or $logdet|S^T S+\delta I|$ to the matrix S (where I is a unit matrix, and δ is a hyperparameter for controlling the regularization function) while placing a constraint on the solution so that a total of values in each column of the matrix P should not exceed 1.

4. The mass spectrometer control method according to claim 1, wherein the cumulative distribution function is a function selected from a cumulative distribution function calculated from a function expressing a Gaussian distribution, a cumulative distribution function calculated from a function expressing a Poisson distribution, a cumulative distribution function calculated from a function expressing an exponential distribution, and a cumulative distribution function calculated from a function expressing a Tweedie distribution.

5. The mass spectrometer control method according to claim 1, wherein the goodness of fit is determined by a test selected from a Kolmogorov-Smirnov test, a Cramer-von Mises test, and an Anderson-Darling test.

6. The mass spectrometer control method according to claim 1, wherein, when a variance $\sigma_{nm}^2$ of noise in each matrix element $X_{nm}$ is previously known, the probability distribution Pcommon is defined as a standard normal distribution, the cumulative distribution function $F_{nm}(X_{nm}|(SrPr)_{nm})$ is defined as $(X_{nm}-(SrPr)_{nm})/\sigma_{nm}$, and $-|\sigma y^2-1|$ is used as the goodness of fit, where $\sigma y^2$ is given by:

$$\sigma_y^2 = \frac{1}{NM-1}\sum_{n,m} y_{nm}^2$$

which is an unbiased variance of the transformed value $y_{nm}$ whose mean value is assumed to be zero.

* * * * *